UNITED STATES PATENT OFFICE 2,337,059

CHEMICAL PROCESS

Louis A. Mikeska, Westfield, and Erving Arundale, Colonia, N. J., assignors to Standard Oil Development Company, a corporation of Delaware No Drawing. Application January 1, 1942,
Serial No. 425,382

10 Claims. (Cl. 260—681)

The present invention relates to a method for the conversion of meta dioxanes to diolefins and other valuable products and of dioxolanes to saturated aldehydes or ketones. This application is a continuation-in-part of application Serial No. 372,494 filed December 31, 1940. When treated under the reaction conditions described below, meta dioxanes are converted into diolefins, unsaturated alcohols, or other valuable products.

Previous work has shown that meta dioxanes can be converted into conjugated diolefins by contacting with certain catalysts at elevated temperatures in the liquid or vapor phase. One of the difficulties heretofore encountered in carrying out such reactions is that, unless some provision is made for removing one of the reaction products, an equilibrium is set up which prevents the reaction from going to completion. Also, in such reactions, an aldehyde is formed during the conversion of the cyclic acetal, and normally, this aldehyde decomposes or condenses with itself or with some of the other desirable substances present to yield aldehyde condensation products from which the aldehyde cannot be readily recovered.

The primary object of this invention is to provide a method whereby the aldehyde formed during the conversion of the meta dioxane to a diolefin or the conversion of a dioxolane to an aldehyde or ketone is continually reacted with a substance which effectually removes the aldehyde from the influence of the reaction zone in the form of a compound from which the aldehyde can readily be regenerated for use. The continuous reaction of the aldehyde with another substance disturbs the equilibrium and this enables the conversion of the cyclic acetal to go to completion. Other and further objects will be apparent in the following specification.

According to the present invention, cyclic acetals and substituted derivatives thereof are reacted with such compounds as are capable of reacting with aldehydes, e. g. mono- or polyhydric alcohols, mercaptans, chlorohydrins, glycol ethers, amino alcohols, organic acids or compounds capable of yielding alcohols or hydroxyl-ated compounds under the reaction conditions. The process of the present invention may be illustrated by the following specific equation:

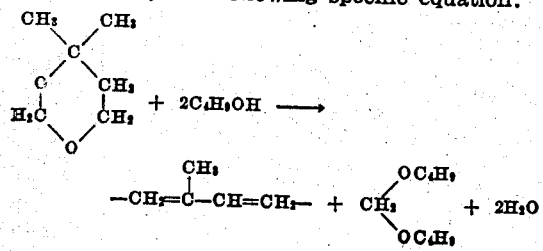

The process is based upon the discovery that when meta dioxanes are converted to diolefins the presence of certain compounds capable of reacting with the aldehyde liberated by the decomposition of the metal dioxane greatly improves the conversion and the yield of diolefin or other valuable products. The compounds added to react with the aldehyde liberated during the decomposition of the cyclic acetal should preferably be chosen so that the acyclic acetal formed therefrom has a materially higher boiling point than that of the diolefin formed, so that said newly formed acyclic acetal will preferably not be carried from the reaction zone along with the vapors of the diolefin. Also, it has been found most desirable to use substances capable of reacting with the liberated aldehyde whose acyclic acetals have boiling points above about 80° C. at atmospheric pressure.

Of all the compounds listed above which are capable of reacting with aldehyde groups, primary alcohols containing one to eight carbon atoms are to be preferred. Such alcohols include methyl, ethyl, normal propyl, normal butyl, isobutyl, normal amyl, isoamyl, normal hexyl, 2 ethyl hexyl, phenyl ethyl and the like. Secondary alcohols can also be used but produce inferior results to the primary alcohols. Tertiary alcohols may be employed, but they react in a somewhat different manner. Under acidic conditions, tertiary alcohols dehydrate to form tertiary olefins. Under the same conditions such olefins react with aldehydes to form meta dioxanes. By selecting the proper tertiary alcohol, the liberated aldehyde will react to form a meta dioxane identical with the dioxane being treated. The following overall reaction illustrates the use of tertiary alcohols.

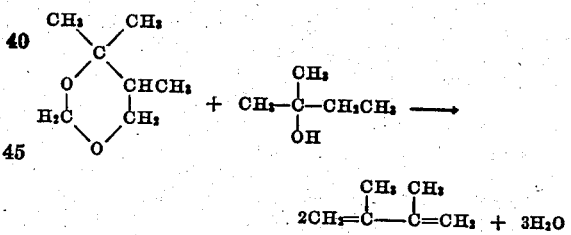

At certain temperatures secondary alcohols act in the same manner.

Lower molecular weight alcohols, e. g. methyl or ethyl alcohol can be used and the reaction temperature and/or pressure raised so that both the acyclic acetal and diolefin are distilled off overhead and subsequently separated.

If organic acids, e. g. acetic, propionic, etc. are used instead of alcohols, the aldehyde liberated during the decomposition of the cyclic acetal reacts to form an acylal which will remain in the reactor while the diolefin is taken off overhead.

The substitution of mercaptans for alcohols results in the formation of mercaptals as by-products which compounds will also remain in the reactor. In the case of substituted alcohols, e. g. chlorhydrins, amino alcohol, glycol monoether, the general reaction is similar to that of the corresponding alcohol although other reactions may also take place.

The meta dioxanes preferably used as starting materials in this process are described by the following general formula:

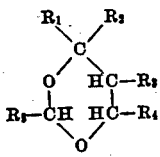

where $R_1$ is an alkyl group and $R_2$, $R_3$, $R_4$ and $R_5$ are alkyl groups or hydrogen atoms. If $R_5$ is an alkyl group, it should contain 1–3 carbon atoms for best operation.

Dioxolanes, which are cyclic acetals possessing a five membered ring may also be subjected to the reaction of this invention but the products will not be diolefins but saturated aldehydes or ketones or their acetals or ketals. For example:

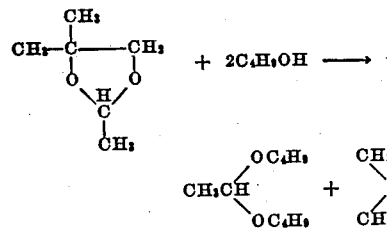

If an excess of alcohol is used, the aldehyde product can be isolated as the acyclic acetal. Otherwise, it can be taken overhead and the acyclic acetal left behind.

It is also within the scope of this invention to react olefins with aldehydes in the presence of an acidic catalyst, separate the lower aqueous layer from the crude reaction product, add a small amount of a concentrated acid and the higher alcohol and reflux under a tower taking the diolefin overhead. This eliminates the necessity of purifying the meta dioxane before use.

Examples of the meta dioxanes which can be treated according to the process of the present invention are as follows:

4,4 dimethyl meta dioxane
2,4,4,6 tetra methyl meta dioxane
4 methyl meta dioxane
2,4,4 tri methyl meta dioxane
4,4,5 tri methyl meta dioxane
4 normal propyl meta dioxane
2,4,4,5,6 penta methyl meta dioxane
2,6 diisopropyl 4,4 dimethyl meta dioxane
4 ethyl 4 methyl meta dioxane
4,4 diethyl meta dioxane
4,4 dimethyl 5 tertiary butyl meta dioxane
4 neopentyl 4 methyl meta dioxane
4 methyl 4 ethoxyethyl meta dioxane
4 methyl 4 vinyl meta dioxane
4 methyl 4 chloromethyl meta dioxane The cyclic acetal and material capable of reacting with the liberated aldehyde are placed together with a small amount of acid reacting catalyst in a reactor equipped with a fractionating column and heated with stirring until all diolefin is removed overhead. The residue in the reactor is then neutralized with an alkali and the acyclic acetal and other valuable compounds present in the neutralized residue recovered.

The reactions of this invention are carried out in the absence of substantial amounts of water. However, it has been found that the presence of small amounts of water in a reaction mixture is not objectionable, since the acyclic acetals formed in these reactions are stable in the presence of both the anhydrous and somewhat diluted catalyst under the conditions involved.

In carrying out the process of the present invention, the alcohol added to react with the aldehyde liberated from the cyclic acetal and the cyclic acetal should be charged to the reactor in a molar ratio of at least 2:1; when glycols are used, the glycol/cyclic acetal molar ratio should be at least 1:1. The use of an excess of alcohol is desirable and especially in cases where the acyclic acetal and diolefin are being taken overhead together. The time required for carrying out the reactions of this invention depends upon the temperature and pressure at which the reactions are conducted, and the nature of the reactants. Generally, the reaction may be completed within a period of from 1 to 10 hours. The preferred temperature range is between 80° C. and 150° C. although higher temperatures can be employed. Cyclic acetals having a tertiary carbon atom attached to an oxygen atom within the ring decompose at a lower temperature than do the cyclic acetals having a secondary carbon atom attached to the ring oxygen atom. The temperature within the reactor can be controlled within the desired ranges by varying the pressure on the reaction system between superatmospheric and pressures as low as 300 mm. (mercury pressure). The temperature depends largely on the meta dioxane and alcohol being used.

Acid acting substances have been found to catalyze the conversion of meta dioxanes into diolefins by this process. Both mineral and organic acid acting substances are effective catalysts for these reactions. Among the mineral acid acting substances are mineral acids, mineral acid acting salts, and substances which are capable of acting as mineral acids in the presence of water. Mineral acid catalysts include HCl, $H_2SO_4$, $HNO_3$, HBr, $H_3PO_4$, $H_2S_2O_7$, $HPO_3$ $H_4P_2O_7$, HF, $HClO_4$, $ClSO_3H$, $FSO_3H$, silico-tungstic acid, dihydroxy fluoboric acid, fluosilicic acid, $BF_3$-$H_2O$ complexes, and the like. Of the mineral acid acting salt catalyst there may be mentioned $FeCl_3$, $Fe_2(SO_4)_3$, $NaHSO_4$, $Al_2(SO_4)_3$, $NaH_2PO_4$, etc. Examples of the compounds which act as catalysts in the presence of water are $SO_2Cl_2$, $SOCl_2$, $SOBr_2$, $SO_2$, $N_2O_3$, NOCl, $PCl_3$, $PCl_5$, $POCl_3$ and $P_2O_5$. The organic catalysts include organic acids and organic acid salts which are capable of giving an acid reaction. These include organic acids, such as chloroacetic acid, oxalic acid, aliphatic and aromatic sulfonic acids, such as hexyl and toluene sulfonic acids, alkyl and dialkyl sulfates, such as diethyl sulfate, alkyl phosphates, acid halides, sulfo acetic acid, $BF_3$-alcohol complexes, and the like. Metallic halides can also be used as catalysts for the reactions of this invention e. g. chlorides of zinc, tin, silicon, titanium and zirconium. The concentration of the catalyst may vary between 85% and 100%, although the use of the more concentrated or substantially anhydrous catalysts is to be preferred. The catalyst can be used in an amount between 1 and 15% by weight of the cyclic acetal charged to the reactor. Meta dioxanes or substituted derivatives thereof may also be converted to dienes in the absence of any catalyst by treatment with alcohols at an elevated temperature.

After all of the diolefin has been distilled off overhead, the residue is neutralized with an alkaline material such as NaOH, Ca(OH)$_2$, Na$_2$CO$_3$, NaHCO$_3$ or an alcoholic solution of potassium hydroxide. The alcohol used in making up the alcoholic potassium hydroxide may be the same alcohol as was used in the reactor during the cyclic acetal decomposition reaction, otherwise methyl, ethyl, or any of the low molecular weight alcohols are suitable. Also, especially in cases where boron fluoride catalysts are used, the neutralization may be carried out by passing ammonia into the reaction mixture. Then, in general, the neutralized mixture is filtered, and any alcohol present in the filtrate is separated therefrom by fractionation. The residue from this fractionation is then filtered to remove salts and the filtrate is subjected to atmospheric or vacuum distillation, the acyclic acetal being obtained as an overhead product. The acyclic acetals may be hydrolyzed under appropriate reaction conditions, e. g., by heating in the presence of a dilute mineral acid or dilute BF$_3$-H$_2$O catalysts, to yield the corresponding aldehydes and alcohols. Or, the acetals may be charged directly into an acid catalyzed olefin-aldehyde reaction where under suitable conditions, acting as a source of aldehyde, they may be converted into meta dioxanes and the saturated alcohol recovered. The cyclic acetals so produced can then be treated according to the process of the present invention. The equation for a typical olefin-acetal reaction is as follows:

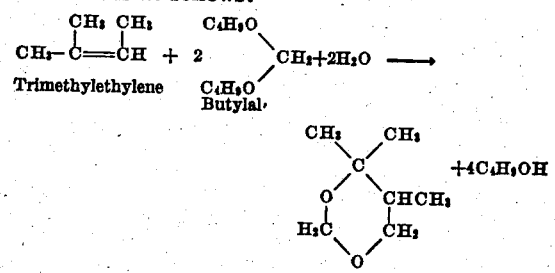

Diolefins can also be produced from meta dioxanes according to the following process. A meta dioxane is reacted with methyl alcohol in the presence of an acid at a temperature below 80° C. and by-product methylal is taken off overhead. The acid is then neutralized and the excess alcohol is distilled off. Finally a dilute mineral acid solution (0.05–5%) is added and the mixture heated above 80° C. under a tower, the diolefin being taken overhead as formed. The diolefins produced according to the process may be used in the preparation of synthetic rubber or as blending agents for fuels. The diolefins can also be reacted with aldehydes in the presence of dilute acidic catalysts to form double meta dioxanes or meta dioxanes unsaturated in the side chain. The latter compounds can then be subjected to the alcoholysis reaction to produce tetra hydric alcohols, unsaturated glycols, triolefins, etc.

The following examples are given for the purpose of illustrating the invention:

*Example 1*

A reactor equipped with a fractionating column was charged with 116 grams of 4,4-dimethyl meta dioxane. To this was added 200 cc. of absolute ethyl alcohol and 4 cc. of concentrated sulfuric acid. This mixture was then refluxed, while a product boiling at 69°–71.5° C. was fractionated off overhead. The reaction was continued in this manner for 8 hours. The temperature of the reaction mixture remained at 83.5°–84° C. during this period. 93 grams of distillate were obtained. This distillate was refractionated whereby 23 grams of isoprene (B. P. 32–35° C.) and 70 grams of ethylal (B. P. 73–75° C.) were obtained.

*Example 2*

116 parts of 4,4-dimethyl meta dioxane, 400 cc. of n-butyl alcohol and 4 cc. of concentrated sulfuric acid were charged to a reactor such as described in Example 1. The mixture was then refluxed, isoprene being taken overhead at 34°–40° C. The temperature within the reactor fluctuated between 108° C.–110° C. At the end of 8½ hours no more isoprene was being obtained and the reaction was discontinued. On redistillation of the isoprene fraction, 34 grams of distillate boiling between 33.5° C. and 34° C. was obtained. This corresponds to 50% of isoprene based on the meta dioxanes charged. The residue in the reactor was treated with alcoholic potassium hydroxide to slight alkalinity, filtered and the filtrate distilled as follows: The excess of n-butyl alcohol was removed by distillation up to 100° C. under a pressure of 180 mm. of mercury. After all of the alcohol had been taken overhead, the pressure was further reduced to 25 mm. of mercury and the residue fractionated into three fractions. A fraction (1) distilled at 65° C.–103° C. and weighed 181 grams; another fraction (2) distilled between 103° C. and 105° C. and weighed 45 grams; a third fraction (3) distilled at 105° C.–123° C. and weighed 13 grams. Fraction 1 was purified by refractionation under a fractionating column at atmospheric pressure yielding 140 grams of butylal boiling at 178° C.–179° C. This corresponds to 88% of the theoretical yield of butylal, CH$_2$(OC$_4$H$_9$)$_2$.

*Example 3*

A mixture of 164 grams of 4,4-dimethyl meta dioxane, 652 grams of 2-ethyl-hexyl alcohol and 6 cc. of sulfuric acid were treated in the manner outlined in Example 2. Temperature in the reactor fluctuated between 110° C. and 115° C. and isoprene was taken overhead at 34° C.–45° C. The overhead product was separated from the water layer and dried over anhydrous sodium sulfate, yielding 89 parts of crude material. On redistillation, 35 grams of isoprene boiling at 34°–34.5° C. were obtained. The residue in the reactor consisted of higher boiling products.

What is claimed is:

1. The process for converting meta dioxanes having the general formula

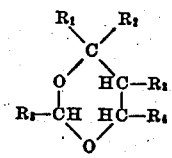

in which R$_1$ is an alkyl radical, R$_2$, R$_3$, R$_4$, and R$_5$ are chosen from the group consisting of hydrogen atoms and alkyl radicals, to diolefins, which comprises reacting one mol of a meta dioxane with at least two mols of an aliphatic alcohol in the presence of an acid-reacting catalyst, at a temperature above 80° C. and recovering the diolefins and by-product acyclic acetals.

2. The process for converting meta dioxanes having the general formula

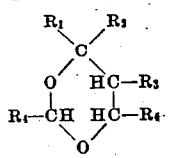

in which $R_1$ and $R_2$ are alkyl radicals, $R_3$ and $R_4$ are chosen from the group consisting of hydrogen atoms and alkyl radicals, to diolefins, which comprises reacting said meta dioxane with an aliphatic primary alcohol containing from 2 to 8 carbon atoms per molecule in the presence of a sulfuric acid catalyst in a concentration of 1–15% based on the meta dioxane, the temperature being maintained above 80° C. and the diolefin being fractionated off continuously as formed.

3. The process for converting meta dioxanes having the formula

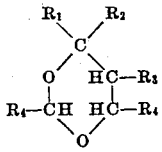

in which $R_1$ and $R_2$ are alkyl radicals, $R_3$ and $R_4$ are chosen from the group consisting of hydrogen atoms and alkyl radicals, to diolefins, which comprises reacting said meta dioxanes with a primary alcohol of from 2 to 8 carbon atoms to the molecule in the presence of an acid-reacting catalyst, the reactor temperature being maintained between 80° C.–150° C., and the diolefins formed in this reaction being removed from the reaction zone as formed.

4. The process for producing isoprene which comprises reacting 4,4-dimethyl meta dioxane with ethyl alcohol in the presence of concentrated sulfuric acid at a temperature of above 80° C. at atmospheric pressure and removing both isoprene and by-product ethylal continuously as formed.

5. In the process for producing diolefins from cyclic aliphatic acetals in which an aldehyde is normally released, the improvement which comprises effecting the reaction in the presence of an acid reacting catalyst at a temperature above 80° C. while in the presence of an organic compound containing a group —X—H, in which X is selected from a group consisting of oxygen and sulfur capable of reacting with the aldehyde whereby the same is removed and the yield of diolefin is increased.

6. In the process for converting cyclic aliphatic acetals to diolefins, which comprises the improvement of effecting the reaction in the presence of an acid reacting catalyst at a temperature above 80° C. and in the presence of an aliphatic compound having a reactive group —X—H, in which X is selected from the group consisting of oxygen and sulfur.

7. The process for converting meta dioxanes having the general formula

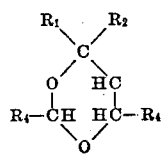

in which $R_1$ and $R_2$ are alkyl radicals, $R_3$ and $R_4$ are chosen from the group consisting of hydrogen atoms and alkyl radicals, to diolefins, which comprises reacting said meta dioxane with an aliphatic secondary alcohol containing at least 2 carbon atoms per molecule in the presence of a sulfuric acid catalyst in a concentration of 1–15% based on the meta dioxane, the temperature being maintained above 80° C. and the diolefin being fractionated off continuously as formed.

8. The process for converting meta dioxanes having the formula

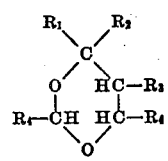

in which $R_1$ and $R_2$ are alkyl radicals, $R_3$ and $R_4$ are chosen from the group consisting of hydrogen atoms and alkyl radicals, to diolefins, which comprises reacting said meta dioxanes with a primary alcohol of from 2 to 8 carbon atoms to the molecule in the presence of an acid-reacting catalyst, the reactor temperature being maintained between 80° C.–150° C., and the diolefin formed in this reaction being removed from the reaction zone as formed.

9. The process for converting meta dioxanes having the general formula

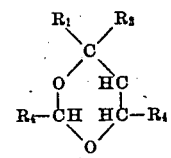

in which $R_1$ and $R_2$ are alkyl radicals, $R_3$ and $R_4$ are chosen from the group consisting of hydrogen atoms and alkyl radicals, to diolefins, which comprises reacting said meta dioxane with an aliphatic tertiary alcohol containing at least 2 carbon atoms per molecule in the presence of a sulfuric acid catalyst in a concentration of 1–15% based on the meta dioxane, the temperature being maintained above 80° C. and the diolefin being fractionated off continuously as formed.

10. The process for converting meta dioxane having the formula

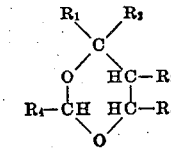

in which $R_1$ and $R_2$ are alkyl radicals, $R_3$ and $R_4$ are chosen from the group consisting of hydrogen atoms and alkyl radicals, to diolefins, which comprises reacting said meta dioxanes with a tertiary alcohol of from 2 to 8 carbon atoms to the molecule in the presence of an acid-reacting catalyst, the reactor temperature being maintained between 80° C.–150° C., and the diolefins formed in this reaction being removed from the reaction zone as formed.

LOUIS A. MIKESKA.
ERVING ARUNDALE.